(No Model.) 2 Sheets—Sheet 1.
W. LOUDEN.
HAY SLING.
No. 493,276. Patented Mar. 14, 1893.
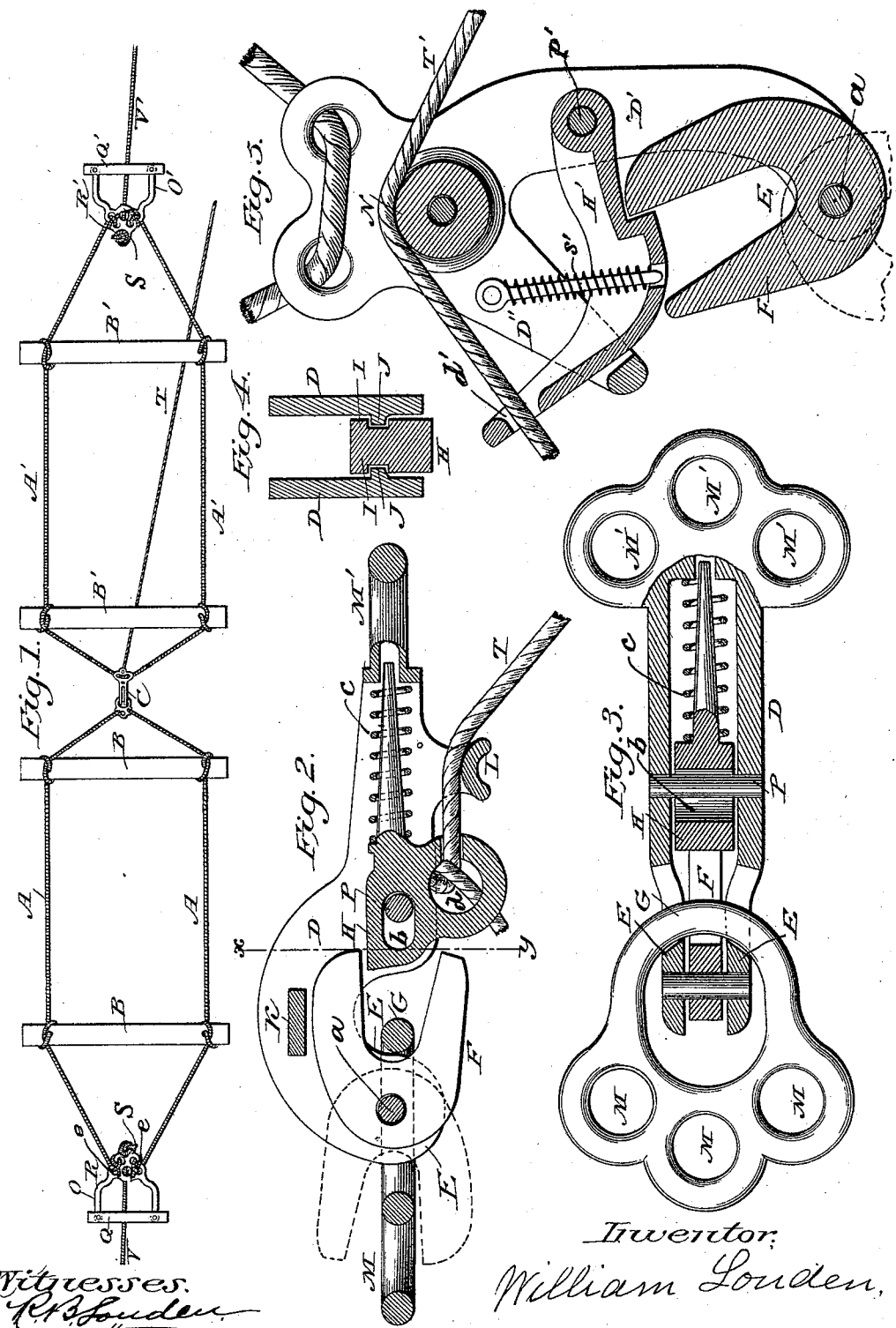
Witnesses.
R. B. Louden
A. J. Fulton
Inventor:
William Louden, (No Model.) 2 Sheets—Sheet 2.
W. LOUDEN.
HAY SLING.
No. 493,276. Patented Mar. 14, 1893.
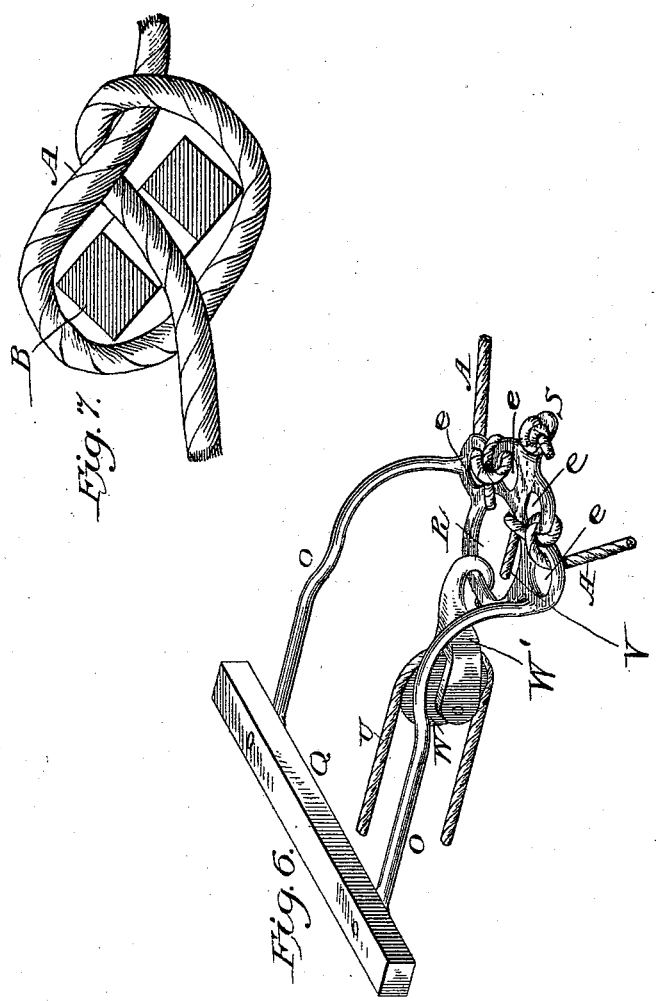
Witnesses.
R. B. Louden
C. J. Fulton
Inventor.
William Louden

UNITED STATES PATENT OFFICE.

WILLIAM LOUDEN, OF FAIRFIELD, IOWA.

HAY-SLING.

SPECIFICATION forming part of Letters Patent No. 493,276, dated March 14, 1893.

Application filed February 20, 1892. Serial No. 422,325. (No model.)

*To all whom it may concern:*

Be it known that I, WILLIAM LOUDEN, a citizen of the United States, residing at Fairfield, in the county of Jefferson and State of Iowa, have invented a new and useful Improvement in Hay-Slings, of which the following is a specification.

My invention relates to an improved form of trip coupling for hay slings: also to an improvement in fastening the ropes, and to other improvements hereinafter set forth.

Figure 1, is a top or plan view of my hay sling. Fig. 2, is a vertical section of the trip coupling. Fig. 3, is a horizontal section of the trip coupling. Fig. 4, is a cross section drawn on the line $x$—$y$ of Fig. 2. Fig. 5, is a horizontal section of a modified form of the trip coupling. Fig. 6, is a perspective of one of the end rings showing the attachment of the ropes and the elevating pulley. Fig. 7, is a cross section of one of the spreaders showing how the ropes are secured to the spreaders.

Similar letters refer to similar parts throughout the several views.

A and A' represent two sets of ropes joined together in the center by a trip coupling C, and having attaching rings R and R' at the ends. The ropes are usually held apart by spreaders B and B' to secure a foundation wide enough for the load of hay to be built upon the sling. The trip coupling (C) is composed mainly of a hollow casting D having its ends E E bent to partially form a hook. Between these ends a U shaped hook F, is pivoted, the pivot $a$ being nearly in the center of the hook. The inner edges of the ends E E are made flush with the bottom of the hook F or even a little beyond it, when locked in position, so that the coupling ring G will rest mainly upon these ends, the office of the hook F being principally to keep the ring G from slipping off the ends E E of the casting D. By this arrangement the strain of the ring G will be exerted mainly on the casting D and the hook F will be correspondingly relieved. One end of the U shaped hook F is adapted to engage a trip catch H while the other end closes the opening through which the ring G enters, and prevents it from being prematurely discharged. The trip catch H has a slot $b$ in its head which plays on a bolt or pin P, and the hook F is released by a pull on the trip cord T thus allowing the hook F to assume the position shown in dotted lines in Fig. 2. A coiled spring $c$ or other suitable means may be used to hold the trip catch in place.

To relieve the strain on the pin P, I form flanges I. I on the head of the trip catch H which engage corresponding flanges J. J formed on the inner sides of the casting D, as shown in Fig. 4. A stop K is also formed in the casting D to limit the movement of the hook F. The trip cord T is connected to an eye $d$ in the head of the trip catch H, and passes over a loop L formed on the casting D, so as to always secure a direct pull on the trip catch H.

Eyes M are formed on the coupling ring G for the attachment of the ropes A, and also eyes M', on the casting D for the attachment of the ropes A', the whole forming a very compact, durable, easy working trip coupling for a hay sling or for similar purposes.

When preferred, the coupling may be made as shown in Fig. 5, wherein a trip catch H' pivoted to a pin or bolt P' and working within an extended part D'' of the casting D' is used and the trip cord T' is passed over a sheave N as shown in the drawings. A coiled spring S' is used to hold the catch in contact with the hook F. When released the hook F takes the position shown in dotted lines in Fig. 5.

The rings R and R' are formed with projecting arms O. O' respectively to which guards Q Q' are secured, the office of which is to keep the hay away from the elevating pulleys which are connected to the rings R and R' to roll up and elevate the sling load of hay, as those familiar with the art will readily understand. These guards may be constructed in different ways to answer the purpose intended. They may be made an integral part of the castings composing the rings, or of one or more bars or a hood of sheet metal secured to the rings, or other attaching devices used on the ends of the sling, to keep the hay from being drawn into and choking the pulley W, used in elevating the sling.

The rings R and R' are provided with a series of eyes $e$, as shown in Fig. 6 to which the ropes A and A' are secured. The rope is first passed through one of the eyes, then through another and then back under itself so as to bind on itself, as shown in the drawings. By this means the length of the sling ropes can be readily adjusted by simply loosening the rope and slipping it back or forth through the eyes as desired. When tightened by the weight of the load, the ropes will hold wherever they are set in the eyes. It is not material which eye the rope is passed through first, nor in which direction the ends are turned.

Each of the rings R R' is provided with a projection S extending inward or in a direction opposite from the guards Q Q', and in each projection S a hole is preferably formed to receive extension ropes V V' respectively. The extension ropes V V' are used to draw the ends of the sling up from under the hay so that the elevating pulleys can be more easily attached, and be secured to the rings in the manner described, the outer portions of the rings R and R' will be tilted up to some extent and the attachment of the elevating pulley W and hook W' will be more readily effected.

U represents the elevating rope.

The plan of connecting the ropes to the spreaders shown in Fig. 7 has some advantages over those in common use. The rope is first passed through holes near the ends of the spreaders, then around the spreader and under itself, as shown in the drawings. This prevents the splitting of the spreaders and forms a very cheap and easily adjusted fastening.

Having thus described my invention, what I claim as new, and desire to secure by Letters Patent, is—

1. In hay slings, a trip coupling consisting essentially, a casting with a hooked end, a ring to engage it a holder pivoted in the hooked end of the casting and adapted to hold the ring from slipping off it, and a trip catch in the casting to release the holder and discharge the ring, substantially as set forth.

2. In hay slings, a trip coupling consisting essentially of a casting with a hooked end, a ring to engage it, a U shaped hook to hold the ring in place and a trip catch to hold and release the hook, substantially as shown and described.

3. A trip coupling for a hay sling, comprising a casting, a U-shaped hook pivoted at or near its center to the casting, a coupling ring adapted to be engaged by this hook and, a trip catch located and constructed to engage one end of this hook while the other end closes the aperture and prevents a premature discharge of the ring, substantially as set forth.

4. In hay slings, a trip coupling consisting essentially of a hollow casting, a trip catch fitted therein, a hook also pivoted in the casting and adapted to engage the trip catch, and a ring to engage the hook, substantially as shown.

5. In hay slings, a trip coupling consisting essentially of a hollow casting, a trip catch fitted therein, a hook also pivoted in the casting and adapted to engage the trip catch, and a ring to engage the hook, the trip catch being provided with flanges to engage corresponding flanges in the main casting, substantially as shown.

6. In hay slings, a trip coupling consisting essentially of a hollow casting, a trip catch fitted therein, a hook also pivoted in the casting and adapted to engage the trip catch, and a ring to engage the hook, and a stop in the casting to limit the movement of the hook, substantially as set forth.

7. In hay slings, a trip coupling consisting essentially of a hollow casting, a trip catch fitted therein, a hook also pivoted in the casting and adapted to engage the trip catch, and a ring to engage the hook, a loop being formed in the casting to guide the trip cord, substantially as shown.

8. In a hay sling, the combination with a ring having four holes formed at the edge, of a pair of sling ropes the ends of each of which pass successively through two adjacent holes of the ring and thence back between the portion of the ring between the two holes through which the end of the rope passes and the portion of the rope which crosses from one hole to the next hole, substantially as set forth.

9. In a hay sling, the combination with sling ropes, of rings to which one end of each rope is connected, a guard projecting outwardly from each ring, a projection extending from each ring in an opposite direction from the guard, and an extension rope connected to each projection whereby when strain is applied to said extension ropes the guards tend to rise, substantially as set forth.

10. The combination with a hay sling, of guards fitted to the ends of the sling to prevent hay from getting into the elevating pulleys, substantially as set forth.

11. The combination with hay sling, of attaching rings formed with extension arms projecting beyond the rings, and a guard secured to the extension arms for preventing hay from getting into the elevating pulleys, substantially as set forth.

In testimony whereof I affix my signature in the presence of two witnesses.

WILLIAM LOUDEN.

Witnesses:
C. J. FULTON,
R. B. LOUDEN.